May 26, 1931.          L. HOPP          1,807,213
PRICE TICKET HOLDER
Filed June 17, 1929     2 Sheets-Sheet 1
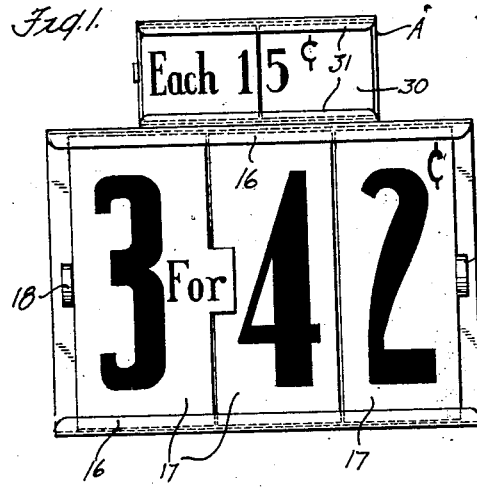
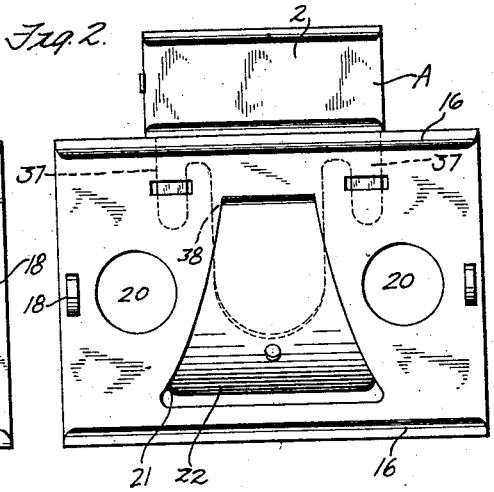
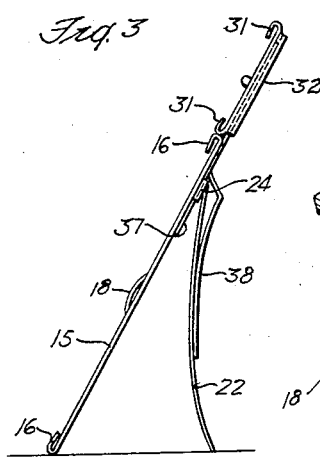
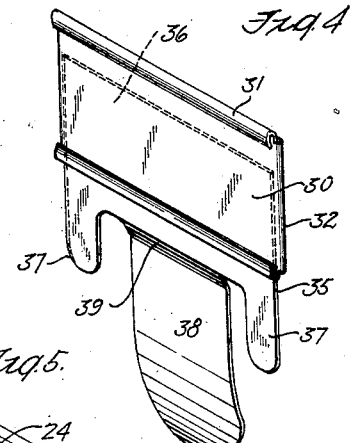
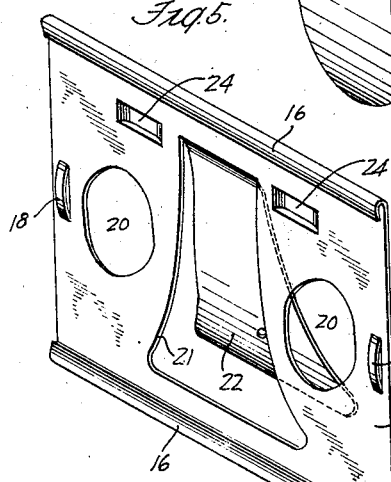
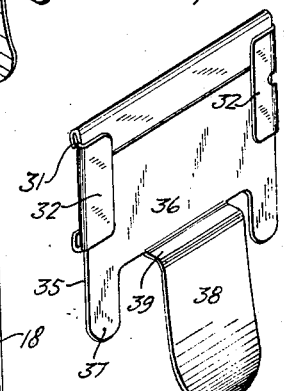
INVENTOR
LEO HOPP
BY Perry H. Pattison
ATTORNEY May 26, 1931.  L. HOPP  1,807,213
PRICE TICKET HOLDER
Filed June 17, 1929  2 Sheets-Sheet 2
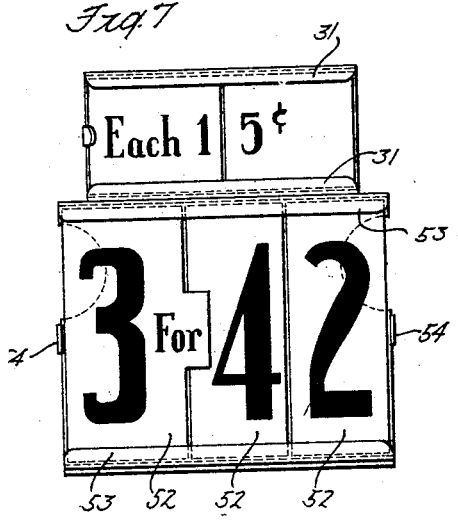
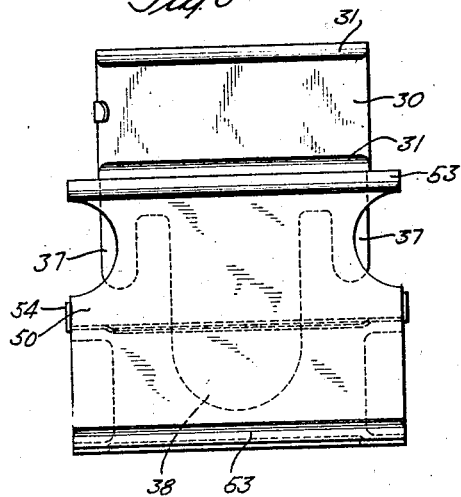
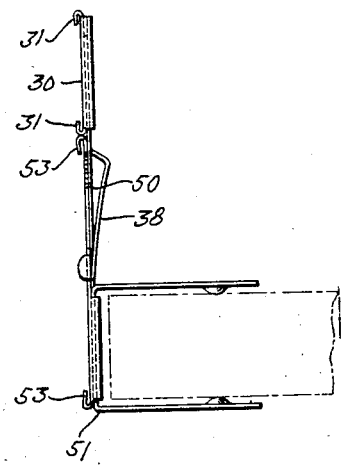
INVENTOR
LEO HOPP
BY
ATTORNEY Patented May 26, 1931

1,807,213

UNITED STATES PATENT OFFICE

LEO HOPP, OF NEW YORK, N. Y., ASSIGNOR OF ONE-HALF TO HARRIETT GOLD AND ONE-HALF TO GEORGE HOPP, BOTH OF NEW YORK, N. Y.

PRICE TICKET HOLDER

Application filed June 17, 1929. Serial No. 371,642.

This invention relates to new and useful improvements in display devices and it pertains particularly to devices for displaying prices of commodities offered for sale.

In grocery stores, butcher shops and the like it is desirable to present a neat and attractive appearance to the shelves carrying the various commodities offered for sale. To this end holders have been employed for displaying the prices of the commodities adjacent thereto. Two forms of such holders are shown in prior Patent No. 1,398,782 of November 29, 1921. These particular holders, however, provide only for the display of the price tickets themselves and do not provide for the display of any additional subject matter such as a unit price, which may relate to the commodity offered for sale.

It is sometimes desirable, particularly where more than a single article is sold for one price, to so indicate in the display of the price, and it is to a price ticket holder capable of use in this connection that the present invention is directed.

It is therefore one of the objects of the present invention to provide a price ticket holder in which data in addition to the price may be displayed.

It is a further object of the invention to provide means for carrying the additional data, which means may be detachably secured to the price ticket holder and the invention is particularly adapted for use in connection with the price ticket holders shown in the afore-mentioned patent, but it is to be understood that the invention is not necessarily limited to use with these particular types of price ticket holders but may be used in connection with various other price ticket holders.

With the above and other objects in view reference is had to the accompanying drawings, in which—

Figure 1 is a view in front elevation of a price ticket holder constructed in accordance with the present invention, and showing the price tickets in place therein, Figure 2 is a similar view showing with the price tickets removed, Figure 3 is an edge view thereof, Figure 4 is a front perspective view of one of the elements of the holder, Figure 5 is a front perspective view of the other element of the holder, Figure 6 is a rear perspective of the element shown in Figure 4, Figure 7 is a view in front elevation showing a slightly modified form of the invention, showing the price tickets therein, Figure 8 is a similar view with the price tickets removed, Figure 9 is an edge view of the form shown in Figures 7 and 8.

A price ticket holder constructed in accordance with the present invention is similar in many respects to that shown in prior Patent No. 1,398,782. As heretofore stated the improvement is particularly adaptable to these types of holders for the reason that by this invention, they may be readily detachably associated together to form a combination ticket displaying device but it is also to be understood that the improvement is not limited to use with such types of price ticket holders and that the same is capable of use with any type of price ticket holder to which it may be conveniently adapted.

In the forms described in Patent Number 1,398,782 the holders are capable only of displaying the price of a commodity and no provision is made for the display of additional data such, for example Each 15¢, the legend shown in the accompanying drawings, and which is used in combination with the price to indicate the unit price of an article for sale. Any legend may, however, be employed in lieu of the one shown.

In that form of the invention shown in Figures 1 to 6 inclusive, the price ticket holder comprises a main body portion 15 having oppositely disposed flanges 16 which form retaining guides for price tickets such as 17 in Figure 1. Stops such as 18 are employed to prevent accidental endwise displacement of the price tickets 17. The ticket holder 15 may also be formed with openings 20 to facilitate placement and removal of the price tickets and the body portion may be cut out as at 21 to provide a supporting leg or prop 22 which as shown in Figure 3 forms the support for the ticket holder when placed upon a substantially flat surface.

Near its top edge the holder is provided with spaced eyes or the like 24 preferably stamped or pressed directly from the material of the holder although if desired they may be separately attached members.

In Figures 1, 2, and 3, there is shown a separate holder adapted for use in connection with the holder 15 above described for the purpose of displaying data additional to that carried by the price tickets 17. This separate holder is designated by the reference character A and preferably comprises a main body portion 30 having oppositely disposed ticket retaining flanges 31. On its ends it is preferably provided with ears or the like 32 which are adapted to embrace the end edges of a suitable supporting member 35 as more clearly shown in Figure 6.

The supporting member preferably comprises a main body portion 36, and it is provided adjacent its opposite ends with tongue projections 37 which project from its lower edge as shown more clearly in Figures 4 and 7.

Also depending from the lower edge of the body portion of the holder A, and interposed with relation to the tongue projections 37, there is a relatively larger tongue member 38, and preferably at a point closely adjacent the lower edge of the body portion 36 of the holder A this larger tongue is formed with a slight off-set 39 the purpose of which will be hereinafter specifically described.

When the holder as illustrated in Figures 4 and 6 is employed in combination with the type of holder shown in Figures 1 to 5 inclusive in the manner set forth in Figures 1 to 3 inclusive, it is attached thereto merely by inserting the tongue members through the rearwardly projecting spaced eyes and positioned with its lower edge engaging the upper edge of the holder 15 as shown in Figures 1 to 3 inclusive. In this position, the supporting leg or prop 22 exerts sufficient pressure upon the tongue 38 to prevent accidental displacement of the holder A, but at the same time will permit of ready attachment and removal of the holder A.

From the foregoing it is apparent that the invention as illustrated in Figures 1 to 6 provides a supplemental holder for use in connection with price ticket holders, which supplemental holder may be readily attached to and detached from said holder as desired.

Referring specifically to Figures 7 to 9 inclusive, of the drawings, the device comprises a price ticket carrying member 50 preferably in the form of a panel and a support engaging means 51, the latter being preferably in the form of a resilient member substantially U-shaped in cross section. The support engaging member 51 is adapted for engagement with the edge of a shelf or similar support in such a manner as to display a plurality of price tickets such as 52 which are carried by the front face of the panel 50. The price tickets 52 are retained in position upon the front face of the panel by having their upper and lower edges positioned beneath the ticket retaining flanges 53 and are prevented from movement longitudinally of the front panel 50 by lugs or the like 54.

By this construction it will be apparent that a ticket holder for displaying data relative to the price of a commodity or an article to be sold is provided for use in connection with the price ticket holder shown in Patent 1,398,782, above mentioned, and that said legend-bearing ticket holder is readily removable with respect to the price ticket holder, thus rendering the price ticket holder capable of use with or without the holder for the legend-bearing tickets.

For example, when it is desired to display the price of a single article the ticket holder, such as shown in the aforementioned patent only is employed. When, however, it is desired to display additional data such as unit and group prices or other data, the additional ticket holder is attached to the price ticket holder by the insertion of the tongue 38 of the legend ticket holder between the price ticket carrying panel 50 and the support engaging member 51, as indicated by dotted lines in Figure 8 of the drawings. This data ticket holder is retained in position by frictional contact with the price ticket panel 50 and the support engaging member 51 and can be readily removed merely by withdrawing the tapered tongue 38 from between the price ticket panel 50 and the support engaging member 51. When used in this connection, the off-set 39 of the tongue 38 provides sufficient resiliency in the tongue 38 to provide necessary friction to prevent accidental displacement of the parts.

While I have shown what at the present I believe to be the preferred forms of my invention I wish it understood that I am not to be limited to the specific construction herein illustrated and described, but that the invention is capable of embodiment in other forms which may fall within the purview of the appended claims.

Having thus fully described my invention, what is claimed as new is—

1. A price ticket display device comprising a ticket carrying member, a plurality of eyes projecting rearwardly therefrom, a second ticket carrying element, said second ticket carrying element having means for engagement within said eyes to support the second mentioned ticket carrying element in superimposed relation to the first mentioned ticket holder.

2. A price ticket display device comprising a ticket carrying member, a plurality of eyes projecting rearwardly therefrom, a second ticket carrying element, and a plurality of tongues projecting from said second mentioned ticket carrying element and adapted to be received within said eyes to retain the ticket carrying elements in operative relation.

3. A price ticket display device comprising a ticket carrying member, means for attaching said member to a suitable support, said attaching means being carried by said ticket carrying member at the rear thereof, and a supplemental ticket carrying member removably secured between said first mentioned ticket carrying member and its support engaging means.

4. A price ticket display device comprising a ticket carrying member, means for attaching said member to a suitable support, said attaching means comprising a separate member attached to the rear face of said ticket carrying member, and a supplemental ticket carrying member superimposed with respect to said first mentioned ticket carrying member and removably secured between said first mentioned ticket carrying member and its support attaching means.

5. A price ticket display device comprising two members secured together, one of said members constituting a ticket carrying means and the other member constituting a support engaging means, and a supplemental ticket carrying means interposed between the afore-mentioned ticket carrying means and the support engaging means, and projecting to a point above the first mentioned ticket carrying means.

6. A price ticket display device comprising a ticket carrying means, a support engaging means secured thereto in a manner to provide an intervening space therebetween, and a supplemental ticket carrying means removably retained within the space between the afore-mentioned ticket carrying means and the support engaging means.

7. A price ticket display device comprising a ticket holder, and a support engaging means, said ticket holder and support engaging means being secured together, and a second ticket holder removably held between the first mentioned ticket holder and the support engaging means at their point of securement.

8. A price ticket display device comprising a ticket holder, a support engaging member secured thereto and a supplemental ticket holder, having an extension adapted for interposition between the first mentioned ticket holder and the support engaging member whereby to support the supplemental ticket holder in superimposed relation to the first mentioned ticket holder.

Signed at New York city, in the county of New York and State of New York, this 24th day of May, A. D. 1929.

LEO HOPP.